United States Patent
Kleve et al.

(10) Patent No.: US 9,462,545 B2
(45) Date of Patent: Oct. 4, 2016

(54) METHOD AND APPARATUS FOR A BATTERY SAVER UTILIZING A SLEEP AND VACATION STRATEGY

(71) Applicant: Ford Global Technologies, LLC, Dearborn, MI (US)

(72) Inventors: Robert Bruce Kleve, Dearborn, MI (US); Ritesh Pandya, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 388 days.

(21) Appl. No.: 13/828,307

(22) Filed: Mar. 14, 2013

(65) Prior Publication Data

US 2014/0274223 A1 Sep. 18, 2014

(51) Int. Cl.
*H04M 1/00* (2006.01)
*H04W 52/02* (2009.01)
*H04B 1/3827* (2015.01)

(52) U.S. Cl.
CPC ........ *H04W 52/0209* (2013.01); *H04B 1/3838* (2013.01); *Y02B 60/50* (2013.01)

(58) Field of Classification Search
CPC ........... H04W 52/00; H04W 52/0109; H04W 52/0216; H04L 12/40039; H04L 12/40; H04L 12/12
USPC ........................................ 455/574
See application file for complete search history.

(56) References Cited

U.S. PATENT DOCUMENTS

| | | |
|---|---|---|
| 5,202,617 A | 4/1993 | Nor |
| 5,301,113 A | 4/1994 | To et al. |
| 5,539,399 A | 7/1996 | Takahira et al. |
| 5,686,895 A | 11/1997 | Nakai et al. |
| 5,790,976 A | 8/1998 | Boll et al. |

(Continued)

FOREIGN PATENT DOCUMENTS

| | | |
|---|---|---|
| EP | 2102598 | 1/2013 |
| WO | 2009071364 | 6/2009 |

(Continued)

OTHER PUBLICATIONS

Ford Motor Company, "SYNC with Navigation System," Owner's Guide Supplement, SYNC System Version 1 (Jul. 2007).

(Continued)

*Primary Examiner* — Patrick Edouard
*Assistant Examiner* — Said Elnoubi
(74) *Attorney, Agent, or Firm* — Jennifer M. Stec; Brooks Kushman P.C.

(57) ABSTRACT

A cellular communication module utilized within a battery-powered vehicle comprising a processor configured to activate an extended power mode, wherein the extended power mode allows the cellular communication module to establish a data session with a cellular communication network for a first time period. The process if further configured to activate a low power mode, wherein the low power mode allows the cellular communication module to maintain a registered cellular connection with the cellular communication network for a second time period, and activate a sleep mode, wherein the sleep mode maintains a registered cellular connection with the cellular communication network during a reoccurring wake-up cycle or is disconnected from the cellular communication network for a third time period.

20 Claims, 5 Drawing Sheets

(56) References Cited

U.S. PATENT DOCUMENTS

| | | | |
|---|---|---|---|
| 5,892,346 A | 4/1999 | Moroto et al. | |
| 5,913,917 A | 6/1999 | Murphy | |
| 5,916,298 A | 6/1999 | Kroiss et al. | |
| 6,198,995 B1 | 3/2001 | Settles et al. | |
| 6,337,621 B1 | 1/2002 | Ogino et al. | |
| 6,591,185 B1 | 7/2003 | Polidi et al. | |
| 6,836,728 B2 | 12/2004 | Shimabara | |
| 6,864,807 B2 | 3/2005 | Todoriki et al. | |
| 6,947,732 B2* | 9/2005 | Fraser | 455/420 |
| 7,127,350 B2 | 10/2006 | Oikubo | |
| 7,142,664 B2 | 11/2006 | Seligmann | |
| 7,149,623 B2 | 12/2006 | Flick | |
| 7,277,780 B2 | 10/2007 | Meier-Arendt et al. | |
| 7,346,630 B2 | 3/2008 | Eichstaedt et al. | |
| 7,402,978 B2 | 7/2008 | Pryor | |
| 7,433,714 B2 | 10/2008 | Howard et al. | |
| 7,444,384 B2 | 10/2008 | Horvitz | |
| 7,586,956 B1 | 9/2009 | Mishra et al. | |
| 7,668,644 B2 | 2/2010 | Tengler et al. | |
| 7,873,466 B2 | 1/2011 | Kong | |
| 7,925,426 B2 | 4/2011 | Koebler et al. | |
| 8,000,842 B2 | 8/2011 | Yi et al. | |
| 8,005,453 B2 | 8/2011 | Van Bosch et al. | |
| 8,103,434 B2 | 1/2012 | Helbing et al. | |
| 8,239,127 B2 | 8/2012 | Kono et al. | |
| 8,255,152 B2 | 8/2012 | Barth et al. | |
| 8,284,039 B2 | 10/2012 | Baker et al. | |
| 8,290,695 B2 | 10/2012 | Hiestermann et al. | |
| 8,290,701 B2 | 10/2012 | Mason et al. | |
| 8,294,286 B2 | 10/2012 | Hunter | |
| 8,401,792 B2 | 3/2013 | Yeh et al. | |
| 8,478,642 B2 | 7/2013 | Dey et al. | |
| 8,504,236 B2 | 8/2013 | Guo et al. | |
| 2002/0164998 A1 | 11/2002 | Younis | |
| 2003/0023374 A1 | 1/2003 | Shimabara | |
| 2003/0185162 A1* | 10/2003 | Fraser et al. | 370/311 |
| 2003/0232619 A1* | 12/2003 | Fraser | 455/420 |
| 2004/0073643 A1 | 4/2004 | Hayes et al. | |
| 2004/0162669 A1 | 8/2004 | Nagamasa | |
| 2004/0243307 A1 | 12/2004 | Geelen | |
| 2005/0080552 A1 | 4/2005 | Feldman et al. | |
| 2006/0002413 A1 | 1/2006 | Tsutazawa et al. | |
| 2006/0007022 A1 | 1/2006 | Endo et al. | |
| 2006/0290490 A1 | 12/2006 | Kraus et al. | |
| 2007/0052552 A1 | 3/2007 | Suzuki | |
| 2007/0069734 A1* | 3/2007 | Bertness | 324/411 |
| 2007/0112475 A1 | 5/2007 | Koebler et al. | |
| 2007/0150171 A1 | 6/2007 | Tengler et al. | |
| 2007/0271035 A1 | 11/2007 | Stoschek et al. | |
| 2008/0027606 A1 | 1/2008 | Helm | |
| 2008/0042489 A1 | 2/2008 | Lewis et al. | |
| 2008/0146219 A1* | 6/2008 | Habermas et al. | 455/428 |
| 2009/0021218 A1 | 1/2009 | Kelty et al. | |
| 2009/0099992 A1 | 4/2009 | Horvitz | |
| 2009/0110163 A1 | 4/2009 | Gupta | |
| 2009/0119385 A1 | 5/2009 | Horvitz | |
| 2009/0138188 A1 | 5/2009 | Kores et al. | |
| 2009/0141173 A1 | 6/2009 | Pugel et al. | |
| 2009/0224869 A1* | 9/2009 | Baker et al. | 340/5.1 |
| 2009/0265099 A1 | 10/2009 | Gottlieb | |
| 2009/0309709 A1 | 12/2009 | Bevacqua et al. | |
| 2010/0017249 A1 | 1/2010 | Fincham et al. | |
| 2010/0060016 A1 | 3/2010 | Hunter | |
| 2010/0070253 A1 | 3/2010 | Hirata et al. | |
| 2010/0076675 A1 | 3/2010 | Barth et al. | |
| 2010/0094496 A1 | 4/2010 | Hershkovitz et al. | |
| 2010/0106514 A1 | 4/2010 | Cox | |
| 2010/0106603 A1 | 4/2010 | Dey et al. | |
| 2010/0110077 A1 | 5/2010 | Grossman et al. | |
| 2010/0131188 A1 | 5/2010 | Yeh et al. | |
| 2010/0138142 A1 | 6/2010 | Pease | |
| 2010/0169008 A1 | 7/2010 | Niwa et al. | |
| 2010/0207772 A1 | 8/2010 | Yamamoto | |
| 2010/0235076 A1 | 9/2010 | Ofek et al. | |
| 2010/0237985 A1 | 9/2010 | Landau-Holdsworth et al. | |
| 2010/0256830 A1 | 10/2010 | Kressner et al. | |
| 2010/0274689 A1 | 10/2010 | Hammad et al. | |
| 2010/0286909 A1 | 11/2010 | Tate, Jr. et al. | |
| 2011/0040438 A1 | 2/2011 | Kluge et al. | |
| 2011/0060495 A1 | 3/2011 | Kono et al. | |
| 2011/0060517 A1 | 3/2011 | Kono et al. | |
| 2011/0191265 A1 | 8/2011 | Lowenthal et al. | |
| 2011/0224841 A1 | 9/2011 | Profitt-Brown et al. | |
| 2011/0224852 A1 | 9/2011 | Profitt-Brown et al. | |
| 2011/0225105 A1 | 9/2011 | Scholer et al. | |
| 2011/0230186 A1* | 9/2011 | Shinoda et al. | 455/432.1 |
| 2011/0238457 A1 | 9/2011 | Mason et al. | |
| 2011/0251789 A1 | 10/2011 | Sanders et al. | |
| 2011/0307166 A1 | 12/2011 | Hiestermann et al. | |
| 2011/0309926 A1 | 12/2011 | Eikelenberg et al. | |
| 2012/0016551 A1 | 1/2012 | Krause et al. | |
| 2012/0016576 A1 | 1/2012 | Huang et al. | |
| 2012/0022904 A1 | 1/2012 | Mason et al. | |
| 2012/0029800 A1 | 2/2012 | Kluge et al. | |
| 2012/0065831 A1 | 3/2012 | Ross et al. | |
| 2012/0158299 A1 | 6/2012 | Cerecke et al. | |
| 2012/0179315 A1 | 7/2012 | Tate et al. | |
| 2012/0179362 A1 | 7/2012 | Stille | |
| 2012/0232783 A1 | 9/2012 | Calkins et al. | |
| 2012/0271542 A1 | 10/2012 | Arcot et al. | |

FOREIGN PATENT DOCUMENTS

| | | | |
|---|---|---|---|
| WO | 2009071369 | | 6/2009 |
| WO | 2011003813 | | 1/2011 |
| WO | WO2011/003813 | * | 1/2011 |
| WO | WO 2011003813 A1 | * | 1/2011 |
| WO | 2011021776 | | 2/2011 |
| WO | 2011035427 | | 3/2011 |

OTHER PUBLICATIONS

Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC" Owner's Guide Supplement, SYNC System Version 3 (Aug. 2009).
Kermit Whitfield, "A hitchhiker's guide to the telematics ecosystem", Automotive Design & Production, Oct. 2003, http://findarticles.com, pp. 1-3.
News Release, "Chevrolet and OnStar Give Volt Owners 24/7 Connection and Control via Wireless Smartphone Application", released Jan. 5, 2010.
Josie Garthwaite, "GM's Volt to Launch With Cell Phone App for Remote Control", Jan. 6, 2010, printed from http:/gigaom.com/cleantech/gms-volt-to-launch-with-cell-phone-app-for-remote-control/, Dec. 30, 2010.
BlackBerry Curve Series, BlackBerry Curve 9300/9330—Smartphones User Guide, Version: 6.0 (2011), pp. 144.
BlackBerry Curve Series, BlackBerry Curve 9300/9330—Smartphones User Guide, Version: 6.0 (2011).
GM Onstar Mobile Demonstration Capability for Volt img. retrieved from: Hayes, JW, "GM OnStar App for Chevy Volt". Auto and Racing News, Jan. 6, 2010. <http://autoandracingnews.wordpress.com/2010/01/06/gm-onstar-app-for-chevy-volt/>.
ACDelco, TechConnect, Battery Killers Common Causes of Battery Failure, Jan. & Feb. 2012, pp. 1-8.

* cited by examiner

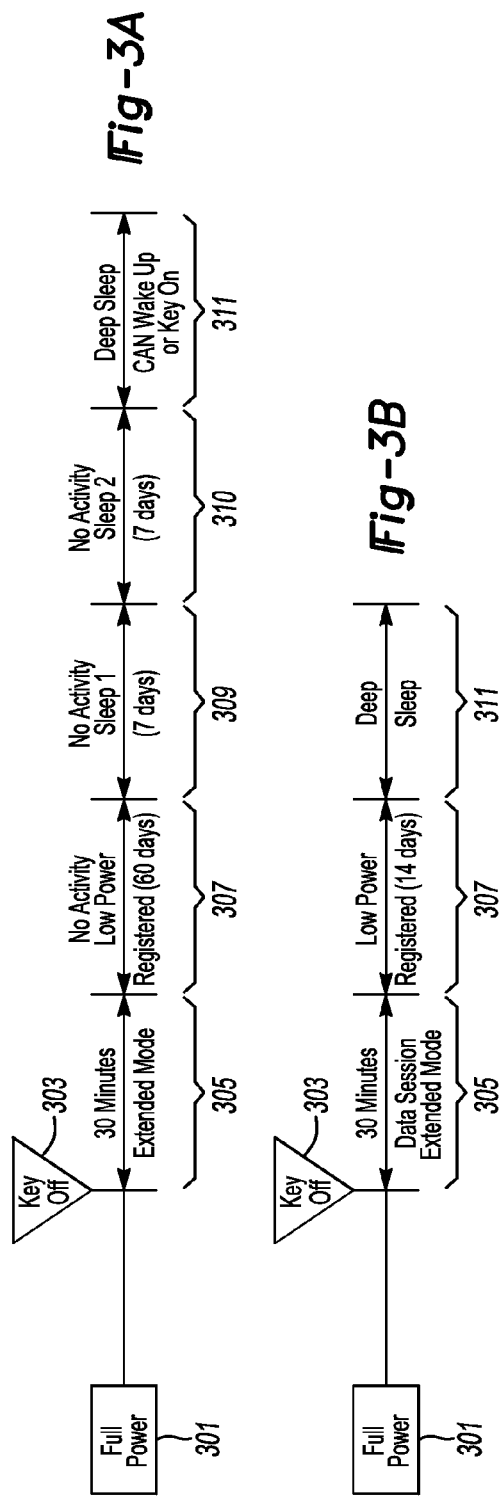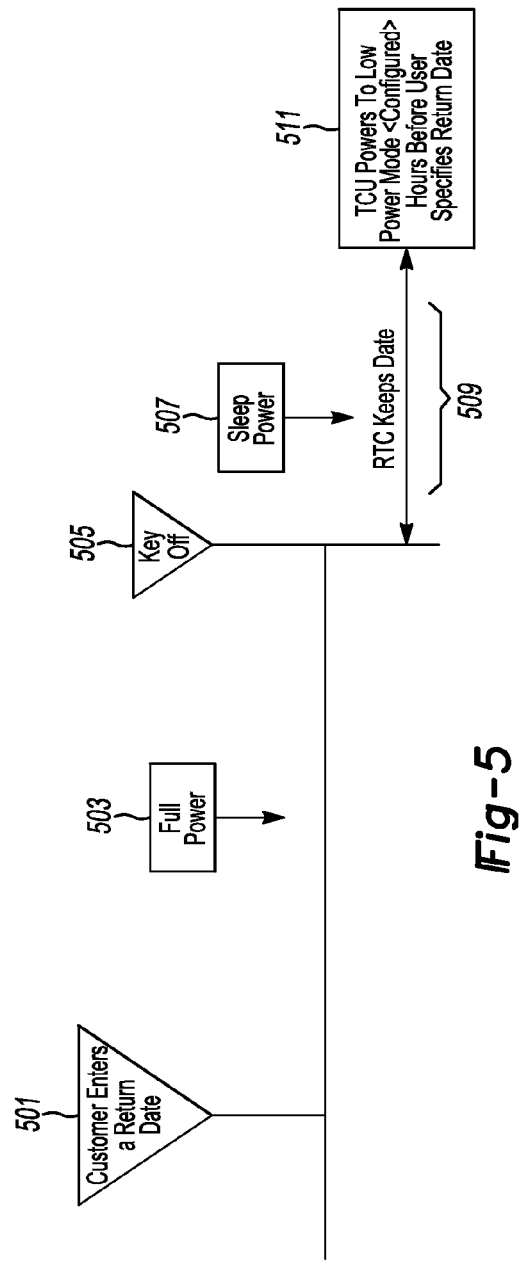

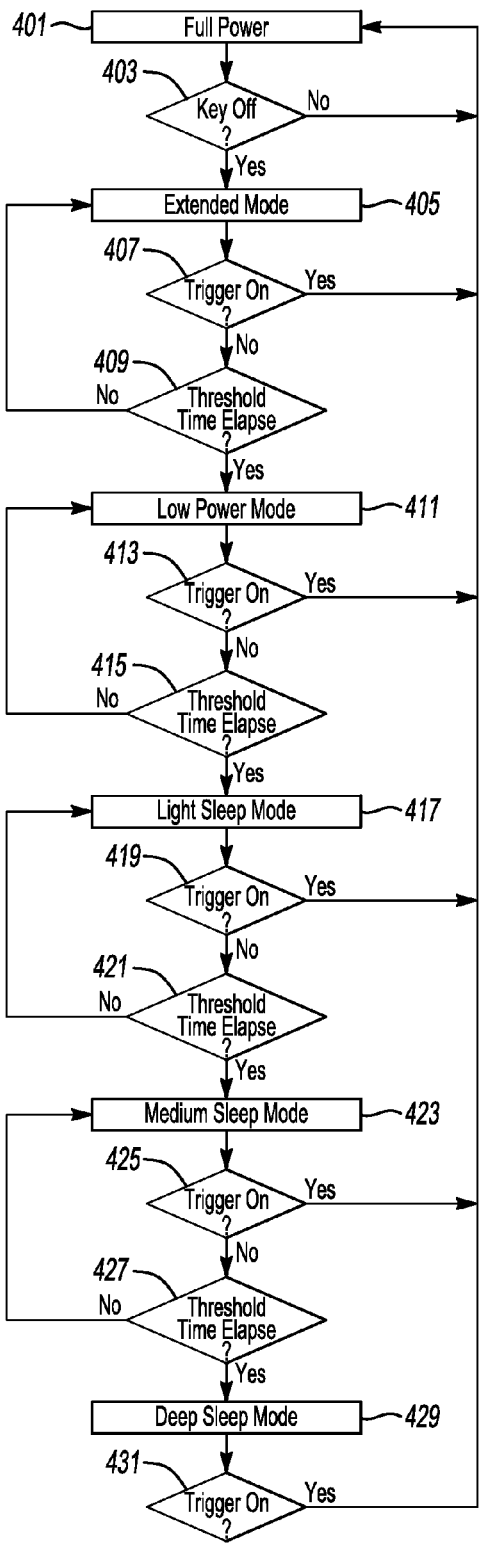
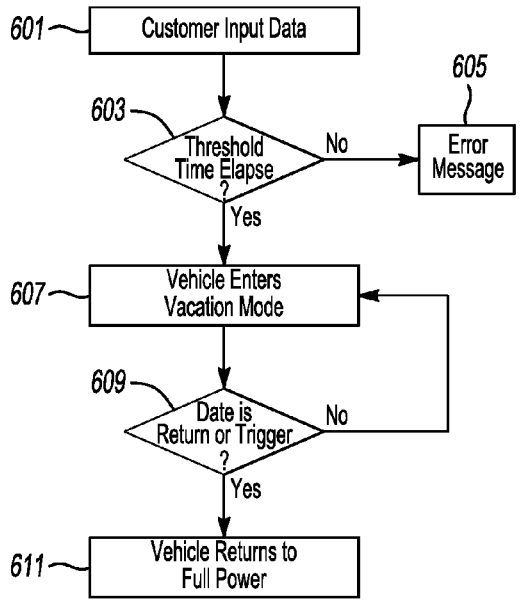
Fig-4
Fig-6

METHOD AND APPARATUS FOR A BATTERY SAVER UTILIZING A SLEEP AND VACATION STRATEGY

TECHNICAL FIELD

The illustrative embodiments generally relate to battery-saving techniques for wireless communication modules.

BACKGROUND

U.S. Pat. No. 6,198,995 generally relates to a method after a vehicle has entered a sleep mode, the disclosed method places the vehicle monitoring system into longer and longer nap periods provided the monitoring system does not receive a wake-up signal from one of a plurality of vehicle subsystems. During the nap periods, the monitoring system requires a reduced amount of operating power thereby decreasing the parasitic current drain on the battery during the sleep mode.

U.S. Pat. No. 8,285,039 discloses a system, method and device for monitoring a vehicle that is provided wherein a vehicle monitoring device regulates its power consumption of a host power source based upon determined states of operation of the vehicle. The power consumption management scheme of the monitoring device utilizes the following modes of operation to regulate power consumption: a work mode, a transport mode, and sleep mode, and a deep sleep mode. The mode of operation of the monitoring device depends on the determined state of vehicle operation. The monitoring device utilizes the various states of operation to power down certain portions of the monitoring device in order to reduce the electric power consumed by the monitoring device. A communication network is adapted to communicate the vehicle data to an end user via an access device. The communication network is also adapted to communicate end-user data via an access device to the monitoring system. The power consumption management scheme of the monitoring device may be remotely configurable by the end user in order to customize the monitoring device's utilization of the stored energy resident within the host power source.

WO3011/003813 generally relates to a method for operating a control device (1) for controlling a plurality of functions in a motor vehicle, wherein a number of functions are performed in a normal operating mode, wherein the control device (1) is connected to a number of waking sources (4), having the following steps:—taking on (S3, S4) a first sleep operating mode, if a first condition is present in the normal operating mode, wherein only part of the functions are performed in the first sleep operating mode and/or at least one of the functions is operated at reduced performance, so that the overall energy consumption in the first sleep operating mode is reduced relative to the energy consumption in the normal operating mode;—taking on (S5, S6) a second sleep operating mode if a second condition is present in the first sleep operating mode, wherein only part of the functions are performed in the second sleep operating mode and/or at least one of the functions is operated at reduced performance, so that the overall energy consumption in the second sleep operating mode is reduced relative to the energy consumption in the first sleep operating mode.

SUMMARY

A first illustrative embodiment discloses a cellular communication module utilized within a battery-powered vehicle comprising a processor configured to activate an extended power mode, wherein the extended power mode allows the cellular communication module to establish a data session with a cellular communication network for a first time period. The process if further configured to activate a low power mode, wherein the low power mode allows the cellular communication module to maintain a registered cellular connection with the cellular communication network for a second time period, and activate a sleep mode, wherein the sleep mode maintains a registered cellular connection with the cellular communication network during a reoccurring wake-up cycle or is disconnected from the cellular communication network for a third time period.

A second illustrative embodiment discloses a method of saving power within a vehicle that includes a cellular communication module, the steps comprising generating a first signal to activate an extended power mode in the cellular communication module, wherein the extended power mode allows the cellular communication module to establish a data session with a cellular communication network. The method further includes generating a second signal to activate a low power mode in the cellular communication module upon the extended power mode lapsing, wherein the low power mode allows the cellular communication module to maintain a registered cellular connection with the cellular communication network, and generating a third signal to activate a sleep mode in the cellular communication module upon the low power mode lapsing, wherein the sleep mode is temporarily disconnected from the cellular communication network.

A third illustrative embodiment discloses a vehicle module, comprising a processor configured to activate a telematics control unit's (TCU) extended power mode to establish a data session with a telecommunication network. The processor is further configured to activate a TCU's low power mode to maintain a registered cellular connection with the network upon the extended power mode lapsing, activate a TCU's sleep mode including a wake-up cycle upon the low power mode lapsing, and activate a TCU's deep sleep mode which is disconnected from the network.

BRIEF DESCRIPTION OF THE DRAWINGS

FIG. 3A illustrates an example of the different stages that the cellular communication module utilizes based on the power-on and power-off cycles of a battery electric vehicle (BEV).

FIG. 3B illustrates an example of the different stages of a cellular communication module utilizes based on the power and power-off cycles of a plug-in hybrid electric vehicle (PHEV).

FIG. 4 illustrates an example of a flow chart for entering and exiting different sleep stages of a cellular communication module.

FIG. 5 illustrates an example of different stages utilized for a vacation mode that may be programed by a user.

FIG. 6 illustrates an example of a flow chart of utilizing the vacation mode feature.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention now will be described more fully hereinafter with reference to the accompanying drawings, in which illustrative embodiments of the invention are shown. This invention, may however, be embodied in many different forms and should not be construed as limited to the embodiments set forth herein. Like numbers refer to elements throughout. As used herein the term "and/or" includes any and all combinations of one or more of the associated listed items.

Figure 1:
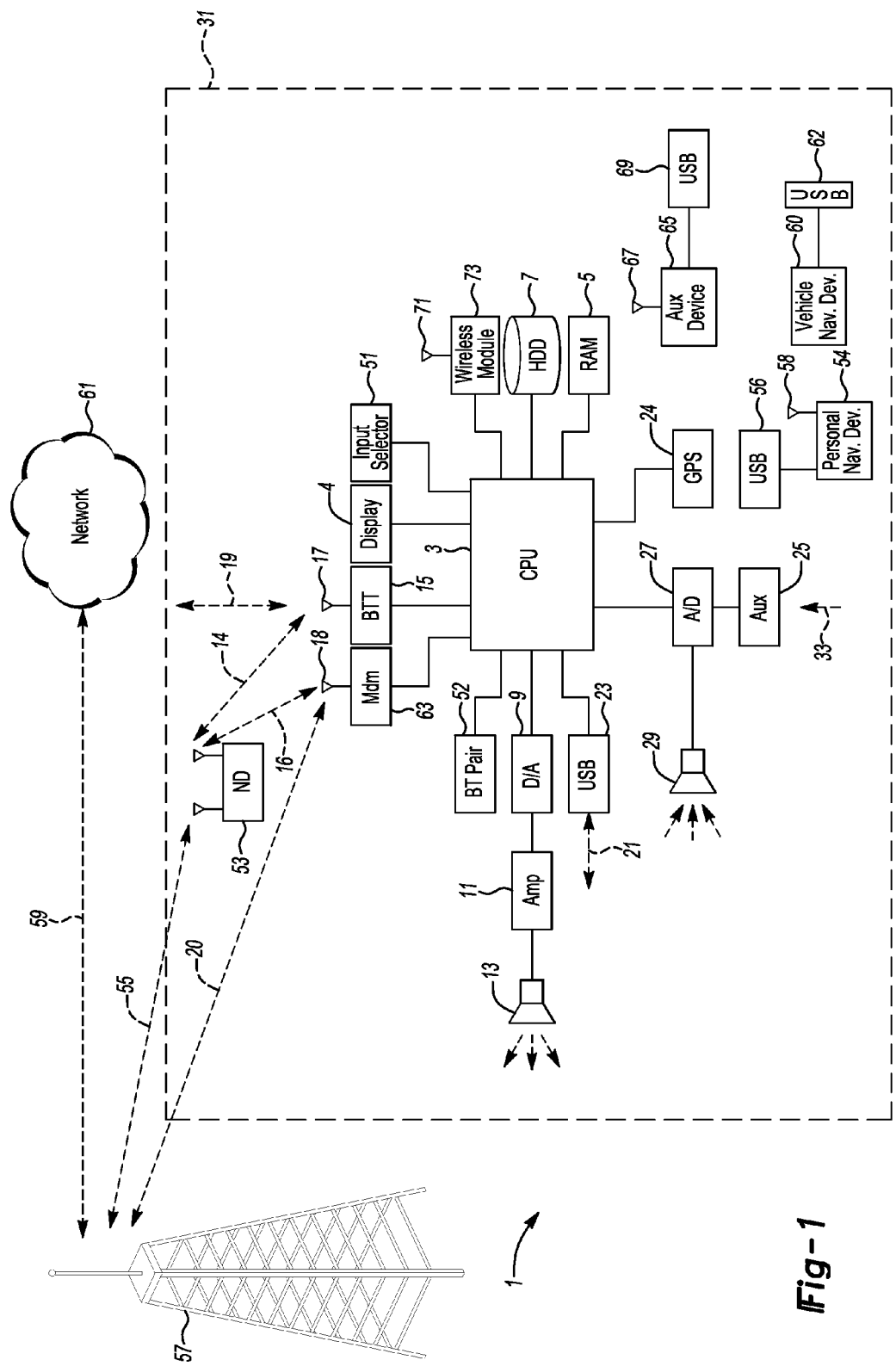
FIG. 1 illustrates an example block topology for a vehicle based computing system for a vehicle.

FIG. 1 illustrates an example block topology for a vehicle based computing system 1 (VCS) for a vehicle 41. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 61 is also provided, to allow a user to select between various inputs. Input to both the microphone and the auxiliary connector is converted from analog to digital by a converter 27 before being passed to the processor. Although not shown, these and other components may be in communication with the VCS over a vehicle multiplex network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 31 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 41 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 41 through, for example, communication 55 with a cellular tower 57. In some embodiments, the modem 63 may establish communication 30 with the tower 57 for communicating with network 61. As a non-limiting example, modem 63 may be a USB cellular modem and communication 30 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (400 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-3000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 41. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, nomadic device, key fob and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

FIGS. 2a-d show illustrative examples of vehicle-based communication modules that provide communication to a remote network.

Figure 2A:
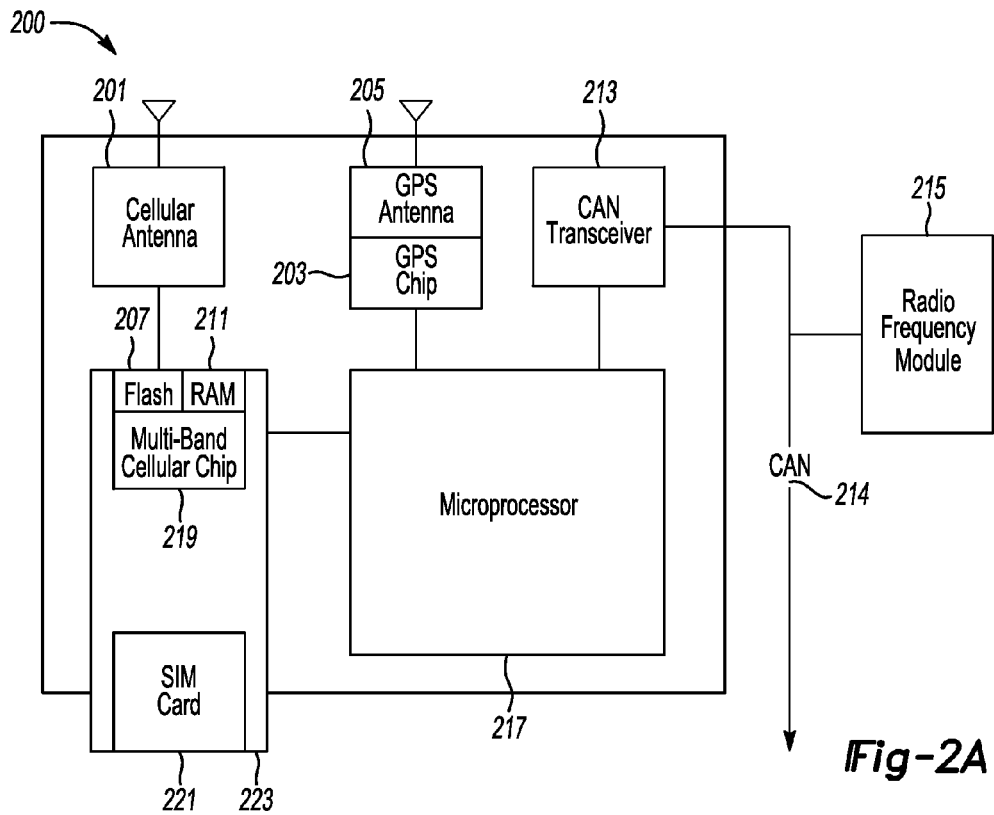
FIGS. 2a-d show illustrative examples of vehicle-based communication modules that provide communication to a remote network.

FIG. 2a shows an illustrative example of a communication module 200 combined with a GPS module, wherein a cellular module and GPS are on different boards.

In this illustrative embodiment, a communications module 200 can include a cellular (e.g., and without limitation, GSM or CDMA) antenna 201 that communicates with a remote server over a cellular network. The received cellular signal may be sent from the cellular antenna 201 to a multi-band cellular (e.g., and without limitation, GSM or CDMA) decoder 219 that processes the received signal to produce information usable by the microprocessor 217.

In this illustrative embodiment, the multi-band cellular chip 219, including flash memory 207 and RAM 211, is installed in the module as part of a removable device 223 including a SIM card 221. The SIM card 221 may contain user identifying information that allows access to the cellular network under a particular user's plan.

Additionally, the module includes a GPS chip 203 that can process and decode a signal from the GPS antenna 205 and send this information to a microprocessor 217.

The microprocessor is also in communication with a vehicle data bus that provides access to various vehicle modules, such as RF module 215. Other modules not shown include, but are not limited to, the vehicle cluster, a remote (off-board) GPS system, a radio module, etc. Non-limiting examples of a vehicle data bus include an SAE J1860 bus, a CAN bus, a GMLAN bus, and any other vehicle data buses known in the art. For illustration purposes only, FIGS. 2a-2d are represented as using a CAN bus.

Figure 2B:
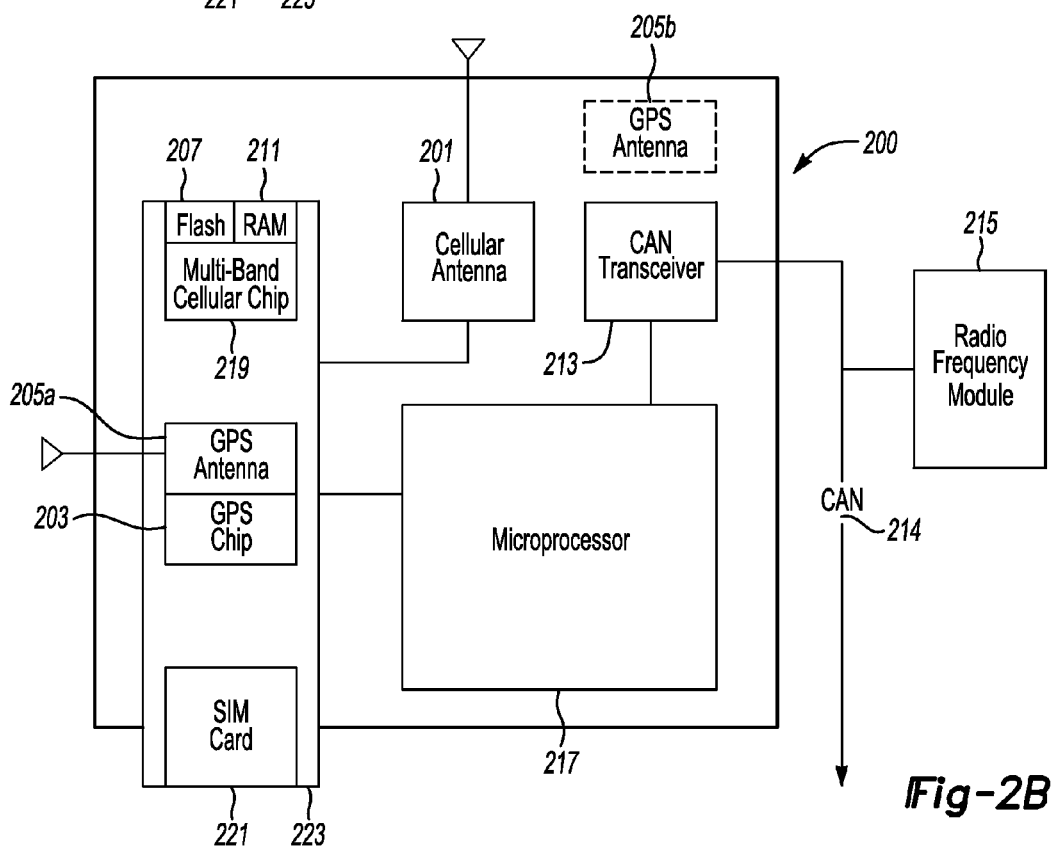

FIG. 2b shows a second exemplary embodiment in which a cellular chip and GPS are on the same board 223. In this illustrative embodiment, the removable board (this board may also be permanently attached to the module) 223 may contain the SIM card 221, a GPS module including a GPS chip 203 and a GPS antenna 205a, and the Multi-band cellular chip 219 including flash memory 207 and RAM 211.

In another embodiment, the GPS antenna 205b may be attached to the module separately from this board 223. When a signal comes in from the cellular antenna 201 and/or the GPS antenna 205b, the signal may be sent to the corresponding cellular/GPS chip 203 for processing, and then passed to the microprocessor 217. The microprocessor 217 interfaces with the CAN transceiver 213 to connect to a vehicle network 214 and vehicle modules such as RF module 215.

Figure 2C:
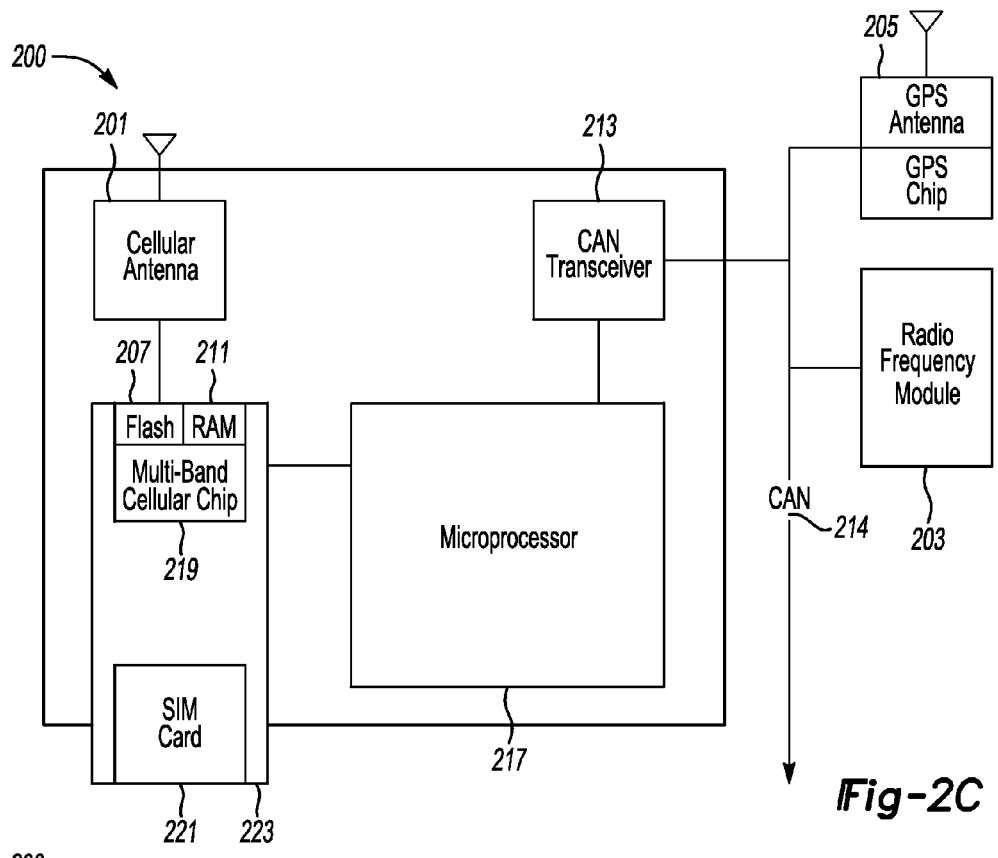

FIG. 2c shows yet another exemplary embodiment in which the cellular module is standalone. In this illustrative embodiment, the GPS module containing the GPS antenna 205 and the GPS chip 203 may connect to the microprocessor 217 through the CAN transceiver 213. Other vehicle modules, such as an RF module 215 can also connect to the microprocessor through the CAN transceiver 213.

In this illustrative embodiment, the removable board 223 may contain a SIM card 221 and a multi-band cellular chip 219, as well as a flash memory 207 and RAM 211. Signals from the cellular antenna 201 may be sent to the board 223 for processing by the multi-band cellular chip 219 before being sent to the microprocessor 217.

Figure 2D:
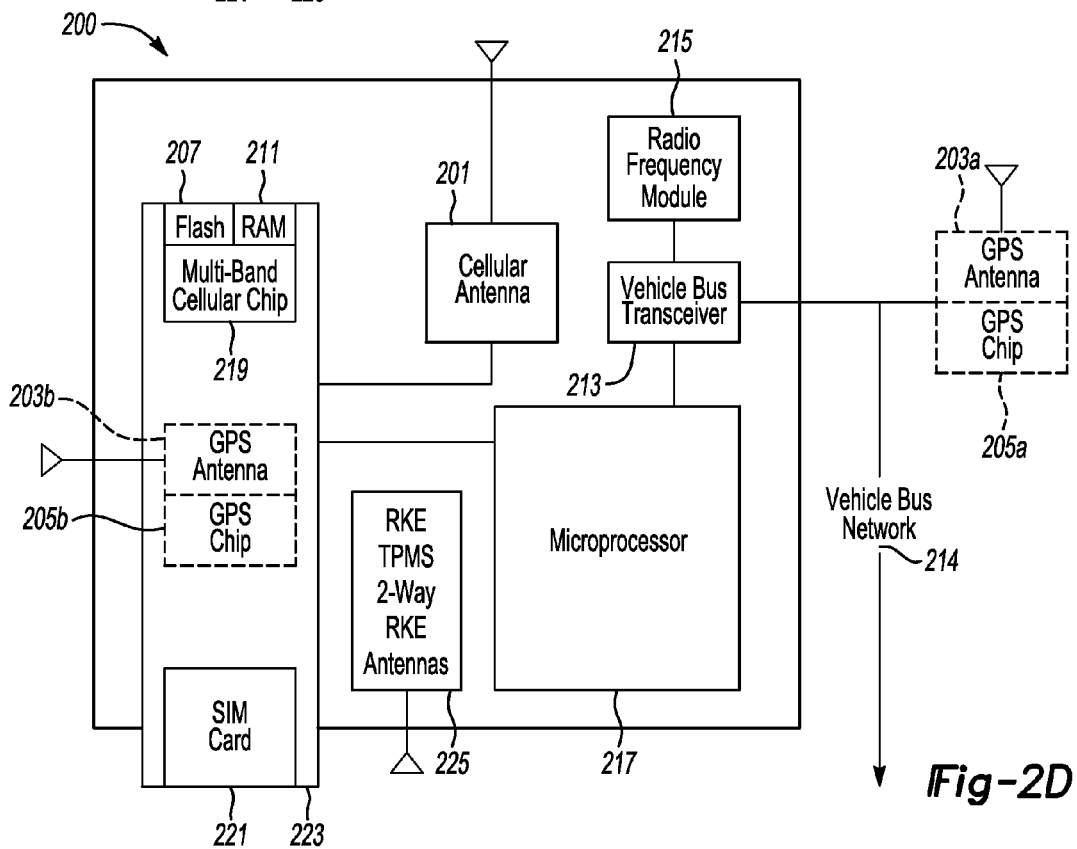

FIG. 2d shows still another exemplary embodiment in which a cellular module is combined with an RF module 215 in the communications module 200. The RF module 215 may continue to talk to the microprocessor 217 through the CAN transceiver 213. In this illustrative embodiment, the GPS module, including the GPS antenna 203a, 203b and GPS chip 205a, 205b can be located within the communications module 200 or located elsewhere in the vehicle, in which case it may communicate with the microprocessor 217 through the CAN transceiver 213.

Again, in this embodiment, the cellular antenna 201 may send a signal to the multi-band cellular 219, including flash memory 207 and RAM 211. The signal may be processed and sent to the microprocessor 217. The multi band cellular chip 219 may be located on a removable circuit board 223, which may also include a SIM card 221.

FIG. 3A illustrates an example of the different stages that the cellular communication module based on the power and power off cycles of a vehicle. The body control module (BCM), may control the cellular communication module's power state, or the cellular communication module may operate on its own in certain embodiments. In the illustrative embodiment of FIG. 3A, the vehicle may be a battery electric vehicle. The vehicle may be operating at full power 301 and all modules and devices may be active, including the cellular communication module. Upon the vehicle triggering a key off 303, the vehicle will exit the full power state and the battery may no longer supply current to all the modules. However, the cellular communication module 305 may enter into an extended power mode for a certain time period. The extended mode may power the cellular radio with data channels open, have the cellular micro on, and also power a real time clock (RTC) and controller area network wakeup circuit. Extended power mode may last for a specific time period, or until a trigger interrupts and fully wakes up the cellular module. The time may be any time period. However, FIG. 2 uses an illustrative example of 30 minutes. Additionally, many different triggers may initiate this interrupt. The triggers may include a wake-up from the controller area network (CAN) bus, a door lock/unlock signal, a signal from the key fob to operate the vehicle, a signal from a cellular phone or a server, and other similar scenarios. During the extended power mode, the cellular communication module may maintain a data connection with the cellular network that allows for immediate two-way data communication.

Upon a threshold period time expiring in which the extended mode is active, the cellular modem may enter into a low-power mode 307 for a certain threshold period of time. The low power mode may utilize less current than the extended mode, thus preserving battery life while providing certain functionality to the cellular communication module. The low power mode may power the cellular radio on with just the control channel open, the cellular micro may be on just to utilize the control channel and the RTC and network wakeup circuit may be on. Although FIG. 3A utilizes a threshold time of 60 days to remain in the low-power mode, any time period may suffice. The low power mode may be active for any period of time until a trigger wakes up the cellular communication module, or the threshold period expires. During the low-power mode, the cellular communication module may not have an active data session, but may include a registered connection with the cellular network. The registered connection may allow the cellular communication module to send/receive SMS messages or maintain a similar connection. Thus, messages sent via a user's mobile phone, a computer, or a server may still be received by the cellar communication module. Upon receiving these messages, the cellular communication module may "wake-up" to activate/deactivate another vehicle module.

Upon a threshold period time expiring in which the low-power mode is active, the cellular modem may enter into a light sleep mode 309 for a certain threshold period of time. The light sleep mode may turn the cellular communication module off, but include a "wake-up cycle." The light sleep mode may facilitate in preserving battery life while providing certain functionality to the cellular communication module. The "wake-up cycle" may allow the cellular communication module to establish an active data session. The cellular communication module may enter back into an inactive mode or power off state upon completion of the wake-up cycle. Additionally, the wake-up cycle may allow the cellular communication module to receive messages via the network to operate certain vehicle modules. In some embodiments, the wake-up cycle may allow the cellular communication module to establish a registered connection with the cellular network to send/receive SMS messages, similar to the connection in the low-power mode.

Although FIG. 3A utilizes a threshold time of 7 days to remain in the light sleep mode, any time period may suffice. The light sleep mode may be active for any period of time until a trigger wakes up the cellular communication module, or the threshold period expires. During the light sleep mode, the cellular communication module may maintain power to the real time clock (RTC) and a CAN wakeup circuit until the wake cycle begins. Thus, messages sent via a user's mobile phone, a computer, or a server may still be retrieved by the cellar communication module once a wake cycle has started. The wake cycle may occur at any period of time, such as every 40 mins, 60 mins, or even 60 days. Upon retrieving these messages, the cellular communication module may "wake-up" to activate/deactivate another vehicle module.

Upon a threshold period time expiring in which the light sleep mode is active, the cellular modem may enter into a medium sleep mode 310? for a certain threshold period of time. The medium sleep mode may maintain power to the real time clock (RTC) and a CAN wakeup circuit to facilitate a "wake-up cycle," although the period of time for initiating the wake-up cycle may be longer during medium-sleep versus light-sleep. For example, the wake-up cycle in medium sleep mode may occur every six hours versus every hour in the light sleep mode. The cellular radio parts and cellular micro may be off while in the light sleep mode. FIG. 3A utilizes a threshold time of 7 days to remain in the medium sleep mode, although any time period may suffice. The medium sleep mode may be active for any period of time until a trigger wakes up the cellular communication module, or the threshold period expires. During the medium sleep mode, the cellular communication module may not maintain any power until the wake-up cycle begins. Thus, messages sent via a user's mobile phone, a computer, or a server may still be retrieved by the cellar communication module once a wake cycle has started. Upon retrieving these messages, the cellular communication module may return to full power or low power mode to activate/deactivate another vehicle module.

Upon a threshold period time expiring in which the medium sleep mode is active, the cellular modem may enter into a deep sleep mode 311 for a certain threshold period of time. The deep sleep mode may keep the cellular communication module off. Additionally, the deep sleep mode may not include a "wake-up cycle." In alternate embodiments, if the deep sleep cycle maintains a period of time for initiating the wake-up cycle, it may be longer during the deep-sleep mode versus medium-sleep mode. For example, the wake-up cycle in deep sleep mode may occur every six days versus every six hours in the medium sleep mode. Once the cellular communication module has entered into the deep sleep mode, it will stay in deep sleep mode until a trigger activates the cellular communication module to wake-up. For example, a user may unlock the door or start the vehicle. Other triggers may include a CAN wake up signal, the key or ignition turning on, unlocking the door, or receiving a signal from a user's mobile device.

FIG. 3B illustrates an example of the different stages of a cellular communication module based on the power-on and power-off cycles of a plug-in hybrid electric vehicle (PHEV). In FIG. 3B, the system does not include a light sleep or medium sleep mode for the plug in mode. Thus, the PHEV may enter into deep sleep mode upon exiting the low power mode which maintains a registered cellular connection. Additionally, the low power mode may be registered for less time than in the battery electric vehicle. However, any time period may suffice for alternative embodiments. Thus different strategies may provide flexibility for vehicles based on the need for conserving the key off battery power. Therefore, entering into deep sleep mode quicker may be beneficial to a customer.

FIG. 4 illustrates an example of a flow chart for entering and exiting different sleep stages of a cellular communication module. Upon the vehicle being on and providing full power 401 to the cellular communication module, the vehicle computer system or controller area network (CAN) bus may determine if the ignition is off 403. If the ignition is not off, the vehicle will stay in full power mode. However, upon turning off the vehicle, the cellular communication module will receive a message and enter into extended mode 405. As described above, extended mode may be for any periodic time for the cellular communication module to keep a connection and active data session.

If a trigger is activated 407 and the cellular communication module receives a message indicating activation of the trigger, the cellular communication module may exit from the extended power mode and enter into full power mode. The trigger may be those described in FIG. 3A and FIG. 3B. The cellular communication module may also analyze if the threshold time has elapsed 409. For example, if the cellular communication module is programmed to stay in extended power mode for 30 minutes, the module may enter the low power mode stage 411 after the 30 minutes elapsed.

Upon entering low power mode 411, the cellular communication module may not be in an active data session, but may be registered with the cellular network and retrieve SMS messages. If a trigger is activated 413 and the cellular communication module receives a message indicating activation of the trigger, the cellular communication module may exit from the low power mode and enter into full power mode. The cellular communication module may also analyze if the threshold time has elapsed 415. For example, if the cellular communication module is programmed to stay in extended power mode for 60 days, the module may enter the light sleep mode stage 417 after the 60 days elapsed.

Upon entering light sleep mode 417, the cellular communication module may be off for a period of time, but include different wake-up cycles. The wake-up cycles may allow the module to establish and maintain a data session or a registered session with the cellular network to receive SMS messages. If a trigger is activated 419 and the cellular communication module receives a message indicating activation of the trigger, the cellular communication module may exit from the light sleep mode and enter into full power mode. The cellular communication module may also analyze if the threshold time has elapsed 431. For example, if the cellular communication module is programmed to stay in light sleep mode for 14 days, the module may enter the medium sleep mode stage 423 after the 14 days elapsed.

Upon entering medium sleep mode 429, the cellular communication module may be off for a period of time, but include different wake-up cycles. The wake-up cycles may allow the module to establish and maintain a data session or a registered session with the cellular network to receive SMS messages. The medium-sleep cycle may periodically trigger the wake-up cycles less often than in the light sleep mode. If a trigger is activated 425 and the cellular communication module receives a message indicating activation of the trigger, the cellular communication module may exit from the medium sleep mode and enter into full power mode. The cellular communication module may also analyze if the threshold time has elapsed 427. For example, if the cellular communication module is programmed to stay in medium sleep mode for 14 days, the module may enter the deep sleep mode stage 429 after the 14 days elapsed.

Upon entering deep sleep mode 429, the cellular communication module may be off indefinitely. The power supplied to the cellular communication module may be minimal or none. In some embodiments, the cellular communication module may maintain enough power to utilize a real time clock (RTC) and to recognize the vehicle area network activity via a controller area network wakeup circuit. Thus the cellular communication module may preserve battery life of the vehicle by drawing zero to minimal current while in deep sleep mode. The deep sleep mode may be exited after a trigger activates the cellular communication module, such as the door opening or a door unlock signal from the key fob. In some alternate embodiments, the cellular communication module may also enter into full power mode for a period of time or to accomplish its task and then return to the mode that was exited without resetting the threshold timer.

FIG. 5 illustrates an example of different stages utilized for a vacation mode that may be programed by a user. The vacation mode may allow the system to enter into deep sleep for a specified time period, without having the cellular communication module entering all of the stages that were described in FIG. 3A, 3B, and FIG. 4. Furthermore, the customer may be able to enter a start date to enter into deep sleep, and an end date to exit the deep sleep mode. Thus, no user interaction is required to exit out of deep sleep to trigger the cellular communication module out of deep sleep mode while in a vacation mode.

While the vehicle is still in full power 503, the customer may utilize an interface to set the vacation mode. The vacation mode interface may be made available on the user interface screen of the multimedia system or the instrument panel cluster. Additionally, vacation mode may be activated via a user's mobile device (e.g. cellular phone, tablet, etc.) or computer. Voice activation is also available in alternative embodiments.

While utilizing the vacation mode user interface, the customer will enter a start date and/or a return date 501 to enter vacation mode. Thus, the customer may realize that they are not going to use their vehicle for a certain period of time, therefore they could save the most energy in their battery by utilizing vacation mode. Full power 503 to the cellular communication module may be maintained until the key or ignition is off 505. Upon turning the ignition off, the vehicle will enter into deep sleep 507 mode if they set a return date. If the customer enters a start date and return date for entering vacation mode, the cellular communication module will enter into deep sleep mode when the start date has begun.

In other embodiments, the user may be able to simply start vacation mode by turning "ON" vacation mode or any other toggle soft button or hard switch. Thus, vacation mode may be entered into for an indefinite amount of time until a signal wakes up the cellular communication module. In yet another embodiment, the system may enter vacation mode by a customer entering a time period to enter into vacation mode. For example, the customer my want to enter into vacation mode for 1 day, 2 weeks, 4 months, 2 years, etc. Thus alternative embodiments are available in which the customer does not have to enter a return date. Additionally, in some embodiments, the vacation mode may be exited early by a configurable amount of time to allow for the potential of an early return of the customer. For instance, perhaps the user's flight arrived early and the user wishes to contact their vehicle earlier than the time originally entered as the return date and time. This strategy allows a customer to contact the vehicle within a buffered time of the return date as a relatively small courtesy period for such occurrences.

In yet another alternative embodiment, the user may be able to enter specific dates in which the system may enter into vacation mode. Thus, a user interface may utilize a calendar to enter random dates, or reoccurring dates (e.g. every Monday, every weekday, every other Tuesday, etc.). The calendar may allow the user to enter vacation mode dates at sporadic times, rather than specific intervals.

From there, the real time clock (RTC) may save the date 509. Thus, the RTC will keep track of the period of time in which the RTC may be utilized. In certain embodiments, the RTC may determine when the start date for vacation mode occurs. The RTC may be required to maintain some minimal power in order to save the date while the vehicle is in vacation mode. The vehicle will return to normal low power mode 511 upon the RTC tracking all relative dates or times.

The telematics control module (TCU) or cellular communication module may enter into a low power mode initially upon entering into vacation mode. Thus, the cellular communication module may enter into low-power mode for period of time just before the start date in order to allow a user to turn off vacation mode remotely. This strategy may allow for the customer to still communicate with the cellular communication module remotely and have the ability to turn off vacation mode if it was entered accidently.

FIG. 6 illustrates an example of a flow chart of utilizing the vacation mode feature. The customer may input a start date of the vacation and a return date 601 to enable the vacation mode feature. In an alternate embodiment, the user may be able to enter a return date, and upon entering the return date and triggering the key or ignition off, the vehicle may enter into vacation mode until the date elapses. The module may check or determine if the date entered is valid 603. If the date is not valid, an error message 605 maybe output to the user. The error message may be output via a vehicle display, user's mobile device, or utilizing audible output through speakers. Some instances in which the vacation mode date may involve an error message is a date in the past, a date too far in the future, or a date which is not available (e.g February 40$^{th}$).

If the cellular communication module determines that the date is valid the vehicle may enter into vacation mode 407. Upon entering into vacation mode, the vehicle may enter into a deep sleep cycle to preserve the battery life of the vehicle. For error proofing, some embodiments may activate the cellular communication module into low power mode upon entering into vacation mode. Upon staying in low power mode for a threshold period of time, the cellular communication module will enter into deep mode. Thus, the vehicle does not need to enter into the periodic stages and may directly enter into a mode, which may preserve the most power. The cellular communication module may stay in vacation mode until the return date has elapsed or a trigger 609 has occurred. Some examples of the triggers may be the vehicle door being open, unlocked, the key fob sending signals to the vehicle, a cellular phone or server sending messages to the vehicle, etc. Upon the date elapsing and/or the trigger sending off the cellular communication module, the vehicle and cellular communication module may return into full power 611.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A cellular communication module utilized within a battery-powered vehicle, comprising:
   a processor configured to:
   activate an extended power mode, following a vehicle key-off, wherein the extended power mode allows the cellular communication module to establish a data session with a cellular communication network for a first time period;
   activate a low power mode, utilizing less current than the extended power mode, following a time-out of the extended power mode, wherein the low power mode allows the cellular communication module to maintain a registered cellular connection with the cellular communication network for a second time period; and
   activate a sleep mode, upon time-out of the low power mode, wherein the sleep mode includes a reoccurring wake-up cycle.

2. The cellular communication module of claim 1, wherein the sleep mode includes a first sleep mode and a second sleep mode, wherein the second sleep mode utilizes less power than the first sleep mode and occurs after a first sleep mode time period lapses, wherein the first sleep mode is operating during the first sleep mode time period.

3. The cellular communication module of claim 2, wherein the second sleep mode includes the reoccurring wake-up cycle initiating less frequently than the reoccurring wake-up cycle of the first sleep mode.

4. The cellular communication module of claim 2, wherein the processor is further configured to activate a deep sleep mode, wherein the deep sleep mode utilizes less power than the second sleep mode and occurs after a second sleep mode time period elapses, wherein the second sleep mode is operating during the second sleep mode time period.

5. The cellular communication module of claim 4, wherein the deep sleep mode is configured to maintain power to the cellular communication module to power a real time clock and a network wakeup circuit of the cellular communication module, and is further configured to be disconnected from the cellular communication network.

6. The cellular communication module of claim 1, wherein the processor is further configured to activate the sleep mode upon the low power mode lapsing.

7. The cellular communication module of claim 1, wherein the processor is further configured to operate upon receiving a signal selected from a group consisting of a car area network wake up signal, a door open signal, a door lock or unlock signal, a key fob signal, a message from a mobile device, or a message from a server.

8. The cellular communication module of claim 1, wherein the processor is further configured to activate a vacation mode, wherein the vacation mode is configured to activate a deep sleep mode that maintains power to the cellular communication module to power a real time clock during a vacation mode time period.

9. The cellular communication module of claim 8, wherein the processor is further configured to initiate the low power mode upon activation of the vacation mode but prior to activating the deep sleep mode during the vacation mode time period.

10. The cellular communication module of claim 8, wherein the vacation mode time period is configured via a user interface of a vehicle computer system.

11. The cellular communication module of claim 10, wherein the user interface includes a calendar, a fixed vacation mode time period, or an input to configure the vacation mode time period.

12. The cellular communication module of claim 8, wherein the processor is further configured to initiate the low power mode at a time after activating the deep sleep mode but prior to the vacation mode time period lapsing.

13. The cellular communication module of claim 8, wherein the vacation mode time period is configured to lapse during an ignition on cycle or activating a network wake up signal.

14. A method of saving power within a vehicle that includes a cellular communication module, comprising:
generating a first signal to activate an extended power mode in the cellular communication module, wherein the extended power mode allows the cellular communication module to establish a data session with a cellular communication network;
generating a second signal to activate a low power mode in the cellular communication module upon the extended power mode lapsing, wherein the low power mode allows the cellular communication module to maintain a registered cellular connection with the cellular communication network and the low power mode utilizes less current than the extended power mode; and
generating a third signal to activate a sleep mode in the cellular communication module upon the low power mode lapsing, wherein the sleep mode is temporarily disconnected from the cellular communication network.

15. The method of claim 14, wherein the method further includes generating a fourth signal to activate a deep sleep mode in the cellular communication module that is configured to maintain power to the cellular communication module to power a real time clock and a network wakeup circuit of the cellular communication module, and is further configured to be disconnected from the cellular communication network.

16. The method of claim 14, wherein the low power mode maintains a registered cellular connection with the cellular communication network without registering a data session.

17. A vehicle module, comprising:
a processor in a telematics control unit (TCU) configured to:
activate an extended power mode (EPM) including a telecommunication network data session;
activate a low power mode (LPM) utilizing less current than the EPM to maintain a cellular connection with the network upon the EPM lapsing;
activate a sleep mode including a wake-up cycle upon the LPM lapsing; and
activate a TCU deep sleep mode disconnected from the network.

18. The vehicle module of claim 17, wherein the processor is further configured to activate a vacation mode, wherein the vacation mode is configured to activate the deep sleep mode during a vacation mode time period.

19. The vehicle module of claim 18, wherein the processor is further configured to initiate the low power mode upon activation of the vacation mode but prior to activating the deep sleep mode during the vacation mode time period.

20. The vehicle module of claim 17, wherein the low power mode maintains a cellular connection with the network without registering a data session.

* * * * *